P. S. GRAY.
SEDIMENT COLLECTOR AND RETAINER.
APPLICATION FILED MAR. 2, 1914.
1,098,347.
Patented May 26, 1914.
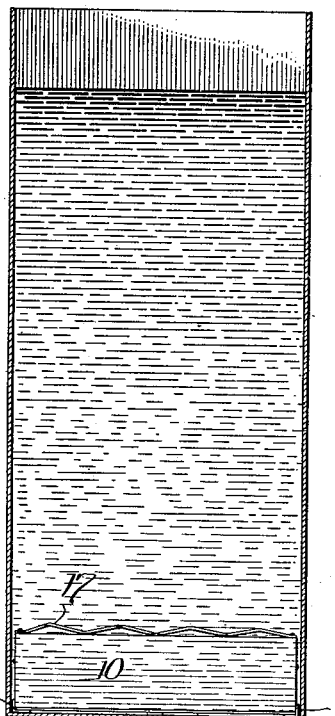
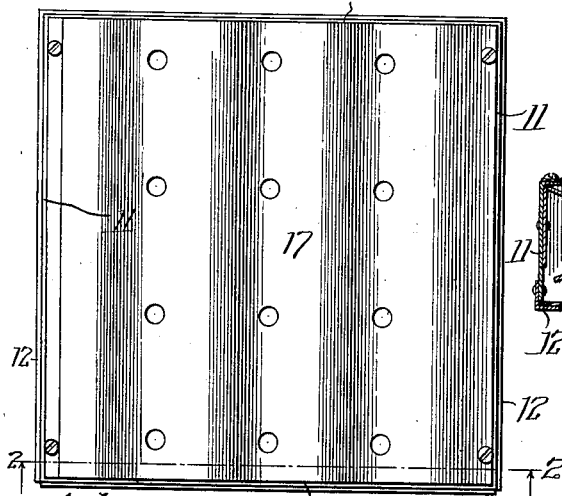
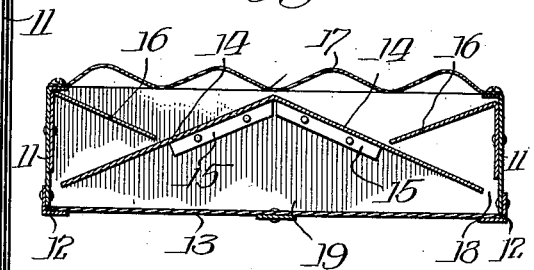
Witnesses
Fred C. Davison
Chas. Koursh
Inventor:
Pembroke S. Gray
By Wilfred C. Lane
Atty

UNITED STATES PATENT OFFICE.

PEMBROKE S. GRAY, OF BOONE, IOWA.

SEDIMENT COLLECTOR AND RETAINER.

1,098,347. Specification of Letters Patent. Patented May 26, 1914.

Application filed March 2, 1914. Serial No. 822,032.

*To all whom it may concern:*

Be it known that I, PEMBROKE S. GRAY, a citizen of the United States, residing at Boone, in the county of Boone and State of Iowa, have invented new and useful Improvements in Sediment Collectors and Retainers, of which the following is a specification.

My invention relates to a new and useful sediment collector and retainer and is especially adapted for use in connection with water boilers, tanks and the like.

The object of my invention is to produce a device designed to be placed in the bottom of a container or receptacle. whereby foreign material or substances of greater specific gravity than that of the liquid in which they are immersed, are caused to be entrapped and held from further circulation in the superimposed liquid.

The further object is, to provide a device of this class with a removable bottom in order that the collected substance or foreign material may be easily and quickly removed from the container when desired.

The above, and other features of novelty, advantages and capabilities will become apparent from a detailed description of the accompanying drawings in which I have illustrated one practical embodiment of the invention, but the construction shown therein is to be understood as illustrative only, and not as defining the limits of the invention.

Figure 1 is a vertical section showing a container equipped with a device adapted to entrap foreign material or substances of greater specific gravity than the liquid in which they are immersed as contemplated by this invention. Fig. 2 is a sectional view of the device removed from the container showing the deflectors for entrapping the collected foreign material or substances, and Fig. 3 is a plan view of the same device also removed from the container.

This device may be of any desired shape, square, rectangular or round, and may be used in connection with any suitable receptacle or container. As shown in the drawings, the device consists of a substantially square body portion having sides 10 and 11 which are in this particular case, as well as all the other parts, constructed of sheet metal. The sides and ends are secured one to another in any suitable manner. The sides 11 are at their lower edges provided with L irons 12 having one flange thereof secured to the outer surface of the sides 11 by any suitable means such as the bolts shown, and the other flange spaced apart from the lower edge of the sides 11 and extending inwardly to form a groove or slide in which is slidably mounted a bottom 13. Extending upwardly from a point spaced apart near the bottom of the sides 11, is a pair of deflectors 14 to a point where they meet near the upper edge of said sides, as best shown in Fig. 2. These deflectors may be secured in position in any suitable manner or by means of flanges 15 and suitable screws or bolts as shown in Fig. 2.

Secured to the sides 11 by means of bolts, as shown, is a pair of deflectors 16 which extend from near the upper edges of said sides downwardly toward the deflectors 15 whose free ends terminate a short distance from said deflectors 15 to permit the foreign material or other substances to pass between said deflectors. These deflectors as shown in the drawings, are made of separate pieces, but where the device is constructed of sheet metal, as in the case here, all said parts could well be made of one piece. Secured to the top of the sides 10 and 11 and extending over the entire upper surface of said device, is a corrugated member 17 which is provided in the depression of the corrugation with a series of holes in alinement.

The device in actual use, assuming that it has been assembled as heretofore described, is placed in the bottom of the tank or container as shown in Fig. 1 and as the foreign material or substances settle to the bottom, it is by means of the ridges of the corrugation in the member 17, caused to pass through the holes in the depression thereof and down the deflectors 15 between these and the deflectors 16 through the openings 18 into the sediment chamber 19 from where it can be removed at any desired time by removing the slidably mounted bottom 13.

The particular advantage of this device is that by the arrangement of the deflectors, the foreign material, after it has passed into the sediment chamber, is entrapped and held from further circulation in the superimposed liquid in the container.

While I have herein shown and described one embodiment of my invention, it is to be understood that various changes and modifications may be made by those skilled in the art without departing from the spirit of my invention.

Having thus described the invention, what I claim as new and desire to secure by Letters Patent, is

1. In a device of the class described, a receptacle, a corrugated member provided with a series of openings near the bottom thereof, a pair of downwardly inclined deflectors below and adjacent to said member for deflecting foreign material or substance downwardly into a chamber below and means for retaining said foreign material from further circulation in a superimposed liquid.

2. In a device of the class described, a receptacle, a corrugated member provided with a series of openings near the bottom thereof, a pair of downwardly inclined deflectors below and adjacent to said member for deflecting foreign material or substance downwardly into a chamber below, means for retaining said foreign material from further circulation in the superimposed liquid and a movable bottom in said chamber for the purpose set forth.

3. In a device of the class described adapted to be placed in a liquid container, a corrugated member provided with a series of openings extending over the upper surface of said device, a pair of deflectors extending inwardly and downwardly adjacent to said corrugated member for deflecting foreign material downwardly in said device and means for retaining said foreign material from again arising above said deflector.

4. In a device of the class described, a receptacle, a pair of deflectors extending downwardly and inwardly at a point spaced apart from the bottom thereof for deflecting foreign material downwardly into the bottom of said receptacle and means for retaining foreign material in the bottom of said receptacle against the circulation of liquid in the retainer, said means comprising a pair of upwardly and inwardly inclined deflectors extending from a point below said first mentioned deflectors to a point substantially parallel with the upper edges thereof.

5. In a device of the class described adapted to be placed in a liquid container, a pair of deflectors extending downwardly and inwardly into said device for deflecting the foreign material downwardly into said device and a lower pair of deflectors extending upwardly and inwardly past the lower edge of said first mentioned deflectors for the purpose set forth.

6. In a device of the class described adapted to be placed in a liquid container, a pair of deflectors extending downwardly and inwardly into said device for deflecting the foreign material downwardly into said device, a lower pair of deflectors extending upwardly and inwardly past the lower edge of said first mentioned deflectors for retaining the foreign material, a sediment chamber therefor and a removable bottom of said chamber for the purpose set forth.

7. In a sediment collector, a retainer adapted to be placed within a receptacle, a corrugated member provided with a series of openings covering the upper side thereof, a pair of downwardly inclined deflectors below and adjacent to said member for deflecting foreign material or substance downwardly into a chamber below and means for retaining said foreign material in a sediment chamber below said deflectors.

In witness whereof, I hereunto subscribe my name to this specification in the presence of two witnesses.

PEMBROKE S. GRAY.

Witnesses:
J. J. SNELL,
K. C. KASTBERG.